United States Patent [19]

Poettgen

[11] 4,189,901

[45] Feb. 26, 1980

[54] FLAIL SHREDDER

[76] Inventor: Anton J. Poettgen, 994 Cypress, Wasco, Calif. 93280

[21] Appl. No.: 907,099

[22] Filed: May 18, 1978

[51] Int. Cl.² ........................................... A01D 50/00
[52] U.S. Cl. .................................... 56/10.4; 56/12.7; 56/14.9
[58] Field of Search ...................... 56/12.7, 10.4, 13.4, 56/14.9, 15.1, 15.2, 15.9, 16.2, 320.1, 17.4; 172/234, 449, 450, 678

[56] References Cited

U.S. PATENT DOCUMENTS

| | | | |
|---|---|---|---|
| 1,725,397 | 8/1929 | Hippie | 172/678 |
| 2,402,365 | 6/1946 | Butler | 172/234 |
| 2,583,897 | 1/1952 | Smeds | 172/678 |
| 2,791,081 | 5/1957 | Allen et al. | 56/10.4 |
| 2,851,846 | 9/1958 | Harp | 56/10.4 |
| 2,867,963 | 1/1959 | Lawrence et al. | 56/320.1 |
| 2,872,990 | 2/1959 | Fraga | 172/449 |
| 3,003,299 | 10/1961 | Smith et al. | 56/10.4 |
| 3,091,906 | 6/1963 | Hall | 56/13.4 |
| 3,221,482 | 12/1965 | Cowling | 56/15.8 |
| 3,261,150 | 7/1966 | Fitzgerald, Jr. | 56/10.4 |
| 3,274,762 | 9/1966 | Jolls | 56/15.2 |
| 3,664,433 | 5/1972 | Bo | 172/458 |
| 3,665,685 | 5/1972 | Allard | 56/10.4 |
| 3,693,335 | 9/1972 | Mathews | 56/12.7 |
| 4,048,789 | 9/1977 | Cartner | 56/10.2 |
| 4,069,651 | 1/1978 | Steffen | 56/320.1 |

Primary Examiner—Russell R. Kinsey
Assistant Examiner—Paul J. Hirsch
Attorney, Agent, or Firm—Huebner & Worrel

[57] ABSTRACT

A flail shredder having a drive shaft mounted for rotation about an upwardly extended longitudinal axis for earth traversing movement transversely of the axis and for adjustable movement transversely of the line of movement; a power drive connected to the shaft; a flail assembly mounted on the lower end of the shaft; a stop limiting the adjustable movement in one direction; a resilient member urging the shaft toward the stop; and a guide wheel mounted concentrically with the shaft for independent rotation, the wheel being disposed for rolling engagement of obstructions so as to urge the shaft away from the stop.

5 Claims, 12 Drawing Figures

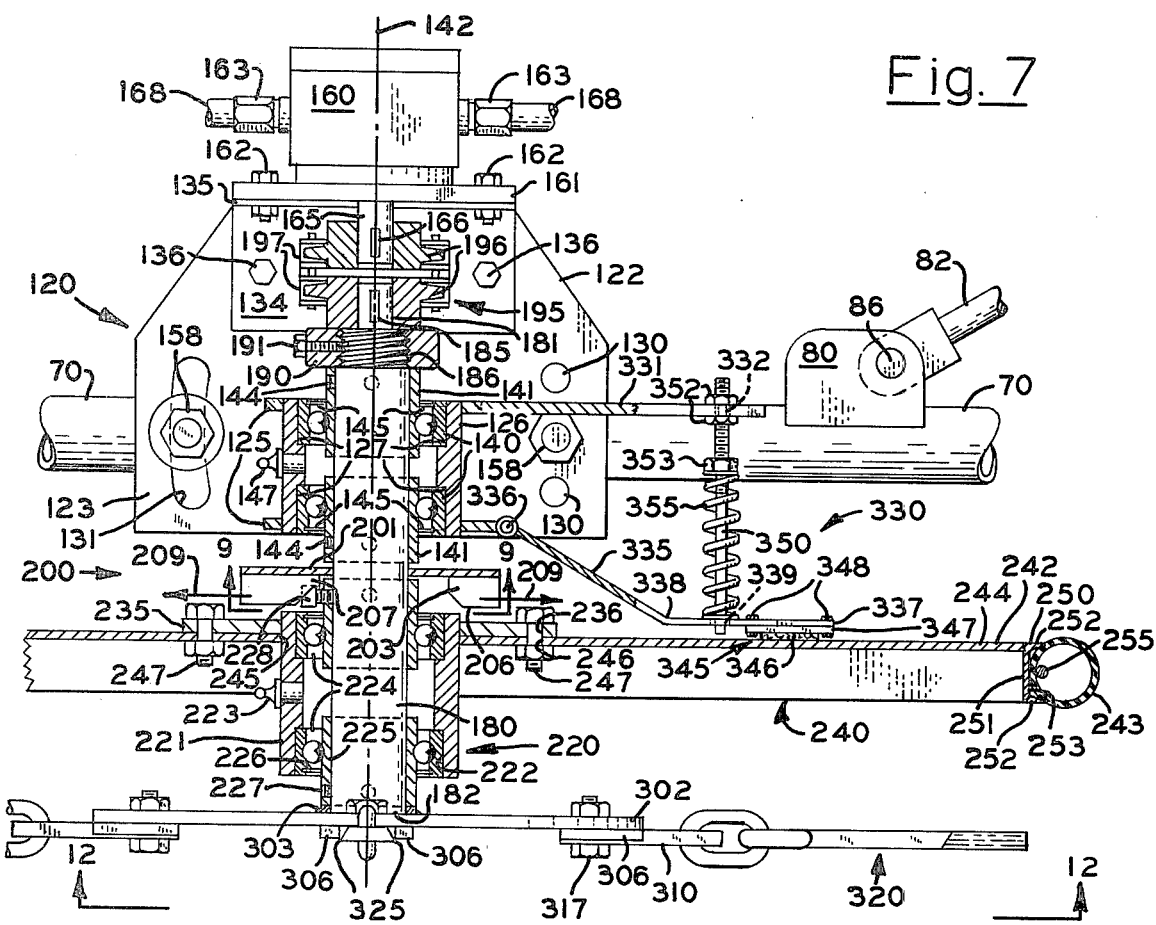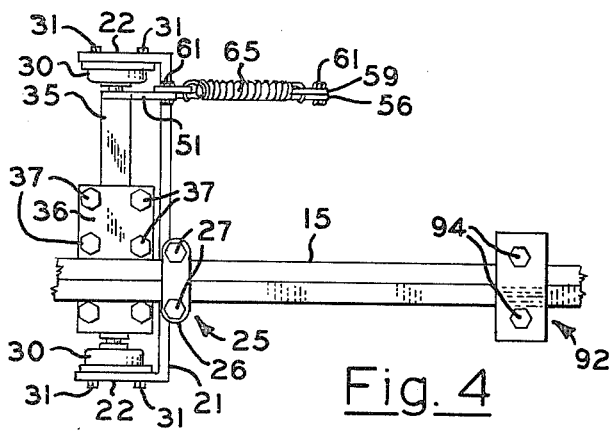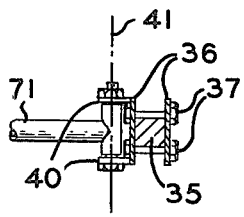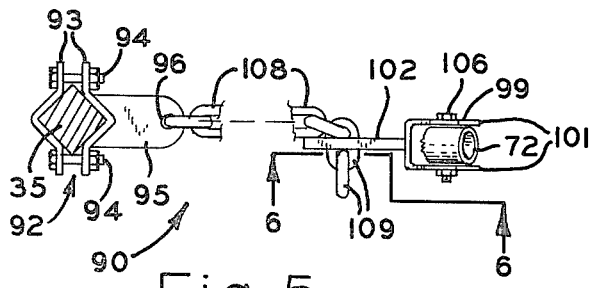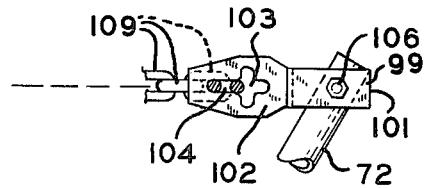

FLAIL SHREDDER

BACKGROUND OF THE INVENTION

1. Field of the Invention

The present invention relates to a flail shredder, and more particularly to such a shredder for shredding weeds and debris during earth traversing movement along a row crop without injury to the crop.

2. Description of the Prior Art

The need to eliminate weeds which utilize water and nutrients which would otherwise be available for the growth of a crop is well known. Such weeds also interfere with harvesting the crop and provide breeding places for harmful insects. Mechanical elimination of weeds has, of course, been long practiced. However, mechanical weeding is particularly difficult when the crop is planted in a row since mechanical devices for this purpose must move along the row so that difficulties arise in removing weeds between individual plants along the row without injury to the plants. Mechanical weeding by devices which engage the soil surface creates additional difficulties by exposing buried weed seeds for growth. Because of these difficulties, it has become common practice to destroy weeds along a row of a crop either by burning or by application of chemicals. Burning can, of course, completely destroy the weeds. However, great care must be exercised, even with crops such as grapevines and fruit trees having relatively large trunks, to avoid killing the crop. With burning, even if the crop is not significantly injured there is always a danger of starting fires in debris along the row or in the weeds which may spread to other crops or buildings. Killing of the weeds with chemicals does not present these dangers present with burning. However, weed killing chemicals can create environmental dangers to other crops, animals, and humans. In any event, chemicals are not completely effective in that they leave standing remnants of the weeds. As a result, the weeds are still present in a form which will interfere with harvesting, harbor insects and plant diseases, or contribute to the spread of fire.

SUMMARY OF THE INVENTION

Therefore, it is an object of the present invention to provide an improved flail shredder for the elimination of weeds in row crops.

Another object is to provide such a shredder which shreds weeds along a row in close proximity to the individual plants without injury thereto.

Another object is to provide such a shredder which eliminates weeds without significantly disturbing the earth surface.

Another object is to provide such a shredder which kills weeds without leaving standing remnants thereof.

Another object is to provide such a shredder which comminutes the weeds.

Another object is to provide such a shredder which can be utilized after chemical killing of weeds to eliminate standing remnants thereof.

Another object is to provide such a shredder which is fully adjustable so as to conform to a wide variety of earth surface configurations.

Further objects and advantages are to provide improved elements and arrangements thereof in a flail shredder of the character described which is dependable, economical, and fully effective in accomplishing its intended purposes.

BRIEF DESCRIPTION OF THE DRAWINGS

FIG. 3 is a fragmentary horizontal section taken on line 3—3 of FIG. 1 showing mounting elements of the shredder.

FIG. 4 is a fragmentary front elevation of the mounting elements taken from the position of line 4—4 of FIG. 2.

FIG. 5 is a fragmentary elevation taken on line 5—5 of FIG. 2 showing a stop utilized in the shredder.

FIG. 6 is a fragmentary view taken on line 6—6 of FIG. 5.

FIG. 7 is a fragmentary vertical section at an enlarged scale taken on line 7—7 of FIG. 2 showing bearing assemblies utilized with the shredder. A flail assembly and elements associated therewith are shown unsectioned and mounted on the assemblies.

DESCRIPTION OF THE PREFERRED EMBODIMENT

Figure 1:
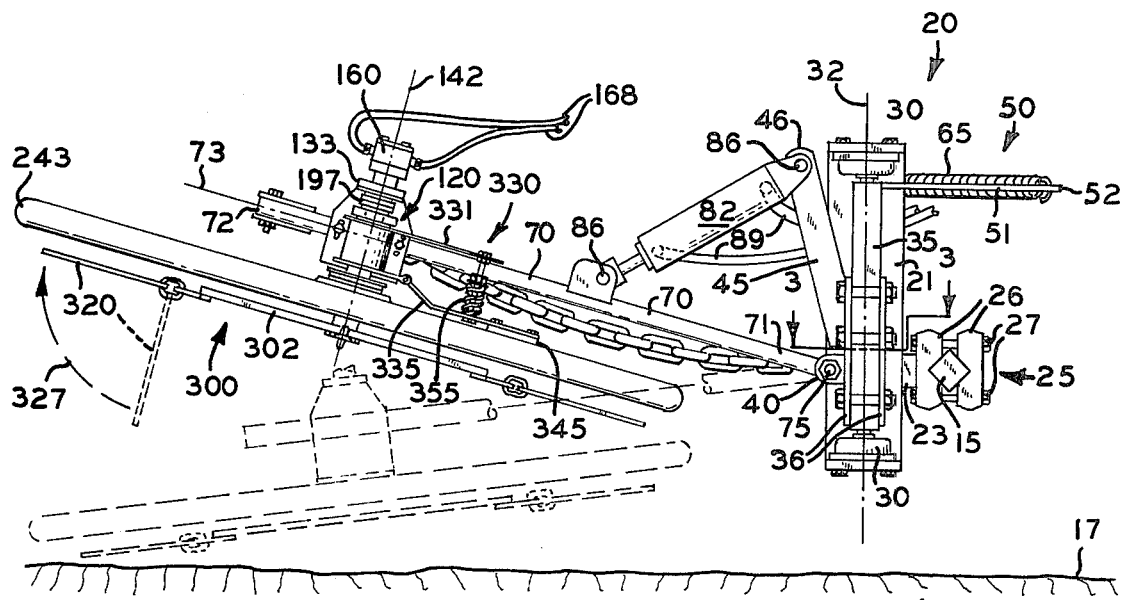
FIG. 1 is a side elevation of a flail shredder embodying the principles of the present invention mounted for earth traversing movement with alternate positions of certain elements indicated by dashed lines.
Figure 2:
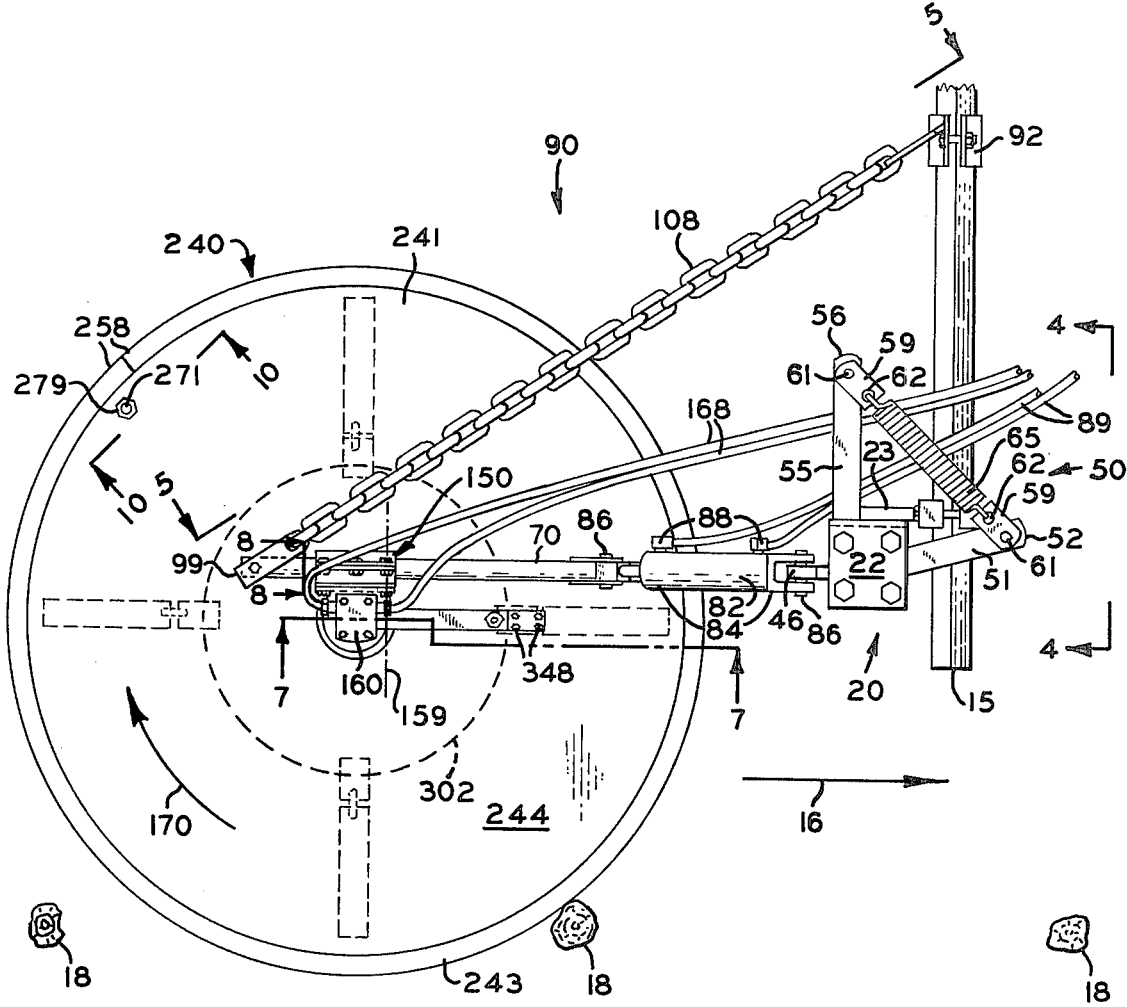
FIG. 2 is a top plan view of the flail shredder of FIG. 1 disposed in operating relation to a row crop.

Referring more particularly to the drawings, in FIGS. 1 and 2 is shown a flail shredder embodying the principles of the present invention. The shredder is mounted on a fragmentarily represented tool bar 15 which has, as shown in FIG. 2, a square cross section with a pair of opposite corners vertically disposed. The tool bar is included in an implement carrying device, such as a tractor, not otherwise shown, for earth traversing movement along a line of travel in a direction indicated by the arrow 16 in FIG. 2. The line of travel is disposed upwardly of an earth surface 17 and is substantially parallel to a row crop disposed transversely to the line of travel. The row has a plurality of obstructions, such as trunks 18 of trees or grapevines, extending in a line parallel to the line of travel.

The flail shredder is mounted on the tool bar by a mounting assembly 20, shown in FIGS. 1, 2, 3, and 4. The mounting assembly has a vertically elongated, rectangular plate 21 lying substantially in a plane parallel to the line of travel. A pair of substantially square horizontal plates 22 individually extend from the vertical plate at the vertically opposite ends thereof toward the row. A lug 23 extends forwardly from the vertical plate to a well-known tool clamp 25. The clamp has a pair of triangularly notched members 26 whose notches individually and oppositely engage the tool bar forwardly and rearwardly thereof. The notched member adjacent to the lug is fixed thereto, as by welding. A pair of bolt assemblies 27 extends individually upwardly and downwardly of the bar through openings, not shown, in the notched members. The clamp can be releasably secured to the bar by tightening of the bolt assemblies. A pair of bearings 30 individually are mounted in facing relation on the horizontal plates 22 by a plurality of bolts 31. The bolts extend vertically through openings, not shown, in said plates into screw-threaded engagement with their respective bearings. The bearings are aligned so as to define an erect first axis 32.

A pivot bar 35 of square cross section extends vertically between the bearings 30 and is mounted therein for pivotal movement about the first axis 32. A pair of plates 36 individually engage in parallel facing relation the forwardly and rearwardly disposed sides of the pivot bar 35 and extend oppositely transversely outwardly of the bar. A plurality of bolt assemblies 37 individually extend through openings, not shown in the plates outwardly of the bar. The plates 36 are releasably clamped to the bar by tightening the bolt assemblies 37. A pair of transversely spaced lugs 40 are fixed to the rearwardly disposed plate and extend rearwardly therefrom. The lugs 40 are provided with a pair of individual bores, not shown, extending therethrough in alignment with a second, substantially horizontal axis 41. An elongated planar extension 45 is fixed, as by welding, at one end to the rearward plate 36 upwardly of the lugs 40 and extends from the plate rearwardly and upwardly approximately to the elevation of the upper horizontal plate 22 to a distal end 46.

The mounting assembly 20 includes a tension spring subassembly, indicated generally by the numeral 50 and shown in FIGS. 1, 2, and 4. The subassembly has a first lever 51 having one end fixed to the vertical plate 21 toward the upper end thereof. The first lever extends substantially horizontally from said plate oppositely of the pivot bar 35 to a distal end 52. The subassembly has a second, substantially horizontally extending lever 55 fixed to the pivot bar at substantially the elevation of the first lever. The second lever extends forwardly and, when the bar is pivoted so that the lug 40 extends rearwardly therefrom, somewhat toward said plate from the pivot bar to a distal end 56. A pair of elongated planar tabs 59 individually are pivotally mounted on the distal end levers by bolt assemblies 61 extending substantially vertically through bores, not shown, in the distal ends of the levers and in one end of the tabs. The ends of the tabs opposite the bolt assemblies are each provided with an individual bore 62. A resilient tension spring 65 has opposite ends fastened in the bores so as to urge the distal ends of the levers toward each other. Movement of the distal ends toward each other pivots the pivot bar 35 in the bearings 30 so that the lug 40 is pivoted toward the row. As a result, elements of the shredder which are mounted on said lug and which subsequently will be described, resiliently are urged with the lug toward the row transversely of the line of travel.

The flail shredder includes a cylindrically tubular elongated arm 70, best shown in FIGS. 1, 2, and 3, mounted at a forward end 71 thereof on the mounting assembly 20. The arm extends rearwardly from between the lugs 40 of mounting assembly to a distal end 72. The arm thus extends oppositely of the direction of travel as indicated by the arrow 16. The cylindrical arm defines an axis 73 extending centrally thereof. The forward end of the arm has a bore, not shown, extending therethrough in alignment with the second axis 41. A pivot bolt assembly 75 extends through the bores in the lugs 40 and in the forward end of the arm and connects the arm to the pivot bar 35 for pivotal movement about the second axis. The arm is thus mounted on the tool bar 15 for pivotal movement of the distal end of the bar transversely of the line of travel toward and from the row about the first axis 32 and for pivotal movement of the distal end toward and from the earth surface 17 about the second axis.

A pair of lugs 80 extend upwardly from the arm 70 centrally therealong in transversely spaced relation. An hydraulic ram 82, best shown in FIGS. 1 and 2, is connected at its axially opposite ends 84 to the lugs 80 and the distal end 46 of the extension 45. The opposite ends of the ram are individually pivotally connected to the lugs and the extension by bolt assemblies 86 extending through suitable bores, not shown in the ends of the ram, the lugs, and the distal end of the extension. The ram is adapted for contractible and extensible movement of its ends toward and from each other. The ram is provided with axially spaced hydraulic connections 88 for selective flow of hydraulic fluid into and out of the ram through a pair of hoses 89 connected to an hydraulic system on the implement carrying device, not shown, for contraction and extension of the ram. Extension of the ram pivots the arm about the second axis so as to move the distal end 72 of the arm toward the earth surface 17. Conversely, contraction of the ram moves the distal end from the earth surface.

The flail shredder includes a stop indicated generally by the numeral 90 and is best shown in FIGS. 2, 5, and 6. The stop interconnects the distal end 72 of the arm 70 and the tool bar 15. The stop has a clamp 92. This clamp is similar to the tool clamp 25 and is, similarly, provided with a pair of triangularly notched members 93 which can be tightened on the tool bar by a pair of bolt assemblies 94. One of the notched members is disposed toward the arm from the tool bar and has an ear 95 extending from said member toward the distal end of the arm. A bore 96 extends through the ear. The clamp is secured to the tool bar oppositely of the row from the mounting assembly 20. The stop has a swivel 99, best shown in FIGS. 5 and 6, having a U-shaped end portion 101 interiorly dimensioned so as to fit diametrically over the distal end of the arm. A planar ear 102 extends centrally from the U-shaped portion oppositely of the interior thereof. The ear is provided with a four-armed, cross-shaped opening 103. One arm 104 of the opening is longer than the other arms and is disposed oppositely of the U-shaped end. The U-shaped end is pivotally mounted on the distal end of the arm by a bolt assembly 106 extending vertically through aligned bores, not shown, in the opposite ends of the U-shaped member and a bore, not shown, through said distal end. The stop 90 includes a chain 108 linking the bore 96 in the ear 95 of the clamp 92 with the cross-shaped opening 103 in the swivel 99. The links 109 of the chain are alternately disposed at right angles in the conventional manner. The chain can, therefore, be drawn through the opening when the longitudinal center line of the chain is positioned centrally of the opening with the alternate links aligned with the arms. The length of chain between the swivel and the clamp can be adjusted by drawing the chain through the opening to a desired point therealong and then sliding the chain in the longer arm 104 away from the center of the opening. A link engaging the link passing through the longer arm thus engages the side of the ear of the swivel opposite of the clamp. As a result, movement of the distal end 72 of the arm 70 toward the row and transversely of the line of travel 16 adjustably is limited.

A first bearing assembly, best shown in FIGS. 1, 2, 7 and 8 and indicated generally by the numeral 120, is mounted on the arm 70 adjacent to the distal end 72 thereof. The bearing assembly has a vertical plate 122 having a rectangular lower portion 123. The plate has a trapezoidal upper portion disposed so that the plate has an upper edge 124 which is shorter than the bottom edge thereof. A pair of mounting plates 125 extends horizontally in vertically spaced relation centrally from said lower portion. A cylindrical tube 126 extends axially through the mounting plates. The tube, mounting plates, and vertical plate are rigidly interconnected, as by welding. Each axially opposite end of the tube is provided with a counterbore 127. As best shown in FIG. 7, a plurality of bores 130 extends through the rectangular lower portion between the tube and one of the vertical edges of said lower portion. A vertically elongated, arcuate slot 131 extends through said lower portion opposite of the tube from the bores 130. An L-shaped motor bracket 133 is mounted on the vertical plate upwardly of the tube. The bracket has a planar vertical leg 134 engaging the vertical plate in parallel relation and a planar horizontal leg 135 extending from said plate at the upper edge 124 thereof above the tube 126. The bracket is coextensive with the upper edge. The bracket is secured to the vertical plate by a pair of bolt assemblies disposed oppositely of the tube and individually extending horizontally through a pair of aligned bores, not shown, in the vertical leg and the vertical plate 122.

A pair of ball bearings 140 individually are fitted concentrically within the counterbores 127. Each bearing is of a well-known type having an inner race 141 which extends axially beyond the outer race at one end thereof. The inner races are coaxially related and define an axis 142 extending therethrough and upwardly from the earth surface 17. The line of travel 16 extends in transverse relation to said axis. Said axis can move transversely of the line of travel with the distal end 72 of the arm 70 on which the first bearing assembly is mounted. The axially extending portion of each inner race is provided with a setscrew 144 extending radially therethrough and screw-threadably engaged therewith. The bearings are fitted with the axially extending portions of their respective inner races oppositely protruding axially from the tube 126. A seal 145 extends between the inner and outer races of each bearing at axial end thereof outwardly disposed in relation to the tube. A well-known grease fitting 147 extends radially through the tube between the bearings. The fitting is screw-threadably engaged with the tube and provides for the supply of grease to the bearings.

Figure 8:
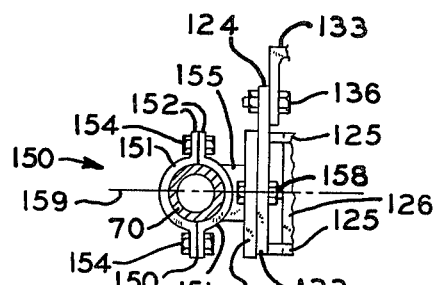
FIG. 8 is a fragmentary vertical section at an enlarged scale taken on line 8—8 of FIG. 2 showing a clamp and elements associated therewith.

The bearing assembly 120 includes a clamp 150, best shown in FIGS. 2, 7, and 8, mounting the assembly on the arm 70. The clamp has a pair of facing semi-cylindrical members 151 which together form a cylindrical tube fitted in circumscribing relation to the arm. A pair of ears 152 extend diametrically oppositely from each of said members. The members are disposed so that the ears extend substantially vertically with the vertically corresponding ears of the members in parallel facing relation. A plurality of bolt assemblies 154 extends through aligned bores in said vertically corresponding ears for drawing the ears together about the arm. One of the semi-cylindrical members has a spacer block 155 fixed thereto oppositely thereof from the other of said members. A plate 156 is fixed to the block oppositely of its respective semi-cylindrical member. The member, block, and plate are rigidly interconnected, as by welding. The plate extends approximately parallel to the ears of its respective semi-cylindrical member and engages the vertical plate 122 in parallel facing relation. A pair of bolt assemblies 158 extends through individual bores, not shown, in the plate in right-angular relation thereto. The bolt assemblies are disposed oppositely of the tube 126 along a line parallel to the arm 70 and individually are aligned with the slot 131 and with the vertical row of the bores 130. The axes of the bolt assemblies thus extend at right angles to the axis of the arm 70 and to the axis 142 defined by the inner races 141 of the ball bearing assemblies. The bolt assembly aligned with the row of bores 130 is extended through a selected one of said bores. The selected bore establishes a desired elevational position, relative to the arm 70 and clamp 150, of the balance of the first bearing assembly 120 and elements of the shredder supported thereby. Said bolt assembly extended through one of the bores 130 defines a pivotal axis 159 extending at right angles to the axis 73 defined by the arm 70 and to the axis 142. The slot 131 is disposed in relation to the bores 130 so that one of the bolt assemblies 158 can be extended through the slot when the other of said bolt assemblies is extended through any one of the bores. The first bearing assembly 120 can be pivoted about the axis of the arm 70 by movement of the semi-cylindrical members 151 thereabout and can be translated longitudinally of the arm by movement of the members along the arm. The bearing assembly can be clamped at any position of such pivotal or translational movement by tightening the bolt assemblies 154 of the clamp 150. The bearing assembly can be pivoted about the axis 159 since the bolt assembly 158 oppositely of the axis 142 from said axis moves through the elongated slot 131. The bearing assembly can be clamped at any position of such pivotal movement by tightening the bolt assemblies.

A well-known hydraulic motor 160, best shown in FIGS. 2 and 7, is mounted upwardly on the horizontal leg 135 of the motor bracket 133. The motor has a planar flange 161 engaged in parallel relation with the horizontal leg. The motor is secured to the bracket by a pair of bolt assemblies 162 individually extending vertically through a pair of aligned bores, not shown, in the flange and in the horizontal leg. The motor has a pair of hydraulic connections 163 and an output shaft 165 extended downwardly therefrom through a bore, not shown, in the horizontal leg. The shaft is substantially concentric with the inner races 141 of the ball bearings 140 and is provided with a keyway 166. The motor is connected to the hydraulic system for supply of hydraulic fluid to and from the motor by a pair of hoses 168 individually connected to each connection of the pair 163. The motor and the hydraulic system are so arranged that the shaft rotates clockwise as viewed from above in FIG. 2 and indicated by the arrow 170. The shaft, preferably, is driven at approximately 2000 revolutions per minute when the shredder is in operation.

The flail shredder includes a drive shaft 180 rotationally mounted in the ball bearings 140 and best shown in FIG. 7. The shaft is coaxially fitted within the inner races 141 of the bearings and rotates about the upwardly extended longitudinal axis 142 defined by said races. The shaft has an upper end 181 juxtapositioned to the output shaft 165 of the hydraulic motor 160 and a lower end 182 in upwardly adjacent relation to the earth surface 17. The upper end of the shaft is approximately the same diameter as said output shaft and is provided with a keyway 185. The balance of the shaft, from a point spaced upwardly of the inner race 141 of the upper ball bearing 140 to the lower end of the shaft, has a diameter such as to be slidably fitted within the inner races 141. The portion of the shaft between the upper end thereof and the inner race of the upper ball bearing is provided with male screw threads 186.

The drive shaft 180 is secured to the inner races 141 for rotation therewith by tightening the setscrews 144 into engagement with the shaft. The weight of the shaft and elements, subsequently to be described, mounted thereon is transferred to the upper inner race by a nut 190 screw-threadably engaging the screw threads 186 in the shaft. The nut is tightened against the upper inner race and secured in position by a setscrew 191 extending radially through the nut and screw-threadably engaged with it.

The drive shaft 180 is rotationally driven from the hydraulic motor 160 by a coupling 195 of a well-known form. The coupling has a pair of chain sprockets 196 individually mounted on the juxtapositioned output shaft 165 of the motor and the upper end 181 of the drive shaft 180. The sprockets are rotationally connected to their respective shafts 165 and 180 by keys in the keyways 166 and 185, respectively, of the shafts. The coupling has a double roller chain 197 peripherally engaging the sprockets for rotational drive of the sprocket mounted on the drive shaft from the sprocket mounted on the output shaft of the hydraulic motor so that the drive rotates in the direction indicated by the arrow 170 in FIG. 2.

Figure 9:
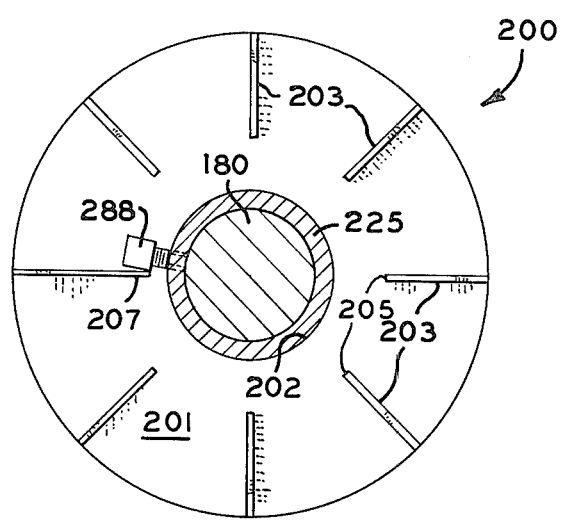
FIG. 9 is a fragmentary horizontal section taken from the position of line 9—9 of FIG. 7 showing a fan.

The flail shredder includes a fan 200, best shown in FIGS. 7 and 9, concentrically mounted on the drive shaft 180 and downwardly spaced from the inner race 141 of the lower ball bearing 140. The fan includes a disk 201 disposed at right angles to the shaft and having a central bore 202 slidably fitted to the shaft. The fan has a plurality of planar blades 203 extending radially inwardly of the disk and equally angularly spaced thereabout. The upper edges of the blades are fixed, as by welding, to the disk. Each blade has a centrally disposed edge 205 which is spaced radially from the shaft and extends parallel thereto. Each blade has an edge 206 disposed oppositely thereto from the disk. This edge extends parallel to the disk from the outer edge of the blade to a point centrally of the blade. From this point the edge extends angularly toward the disk to an intersection with the centrally disposed edge. One of the blades is provided with a unitary, planar driving tab 207 extending radially toward the shaft from the centrally disposed edge of said blade for rotational drive of the fan in a manner subsequently to be described. Rotation of the fan causes air to be drawn into the fan and expelled radially outwardly therefrom as indicated by the arrows 209.

The flail shredder includes a second bearing assembly, indicated generally by the numeral 220 and best shown in FIG. 7, coaxially mounted on the drive shaft 180. This bearing assembly is similar to the first bearing assembly 120 in that the second assembly includes a cylindrical tube 221 having counterbores 222 at the axially opposite ends thereof, a grease fitting 223 between the counterbores, and a pair of ball bearings 224 individually fitted in the counterbores. The bearings 224 are similar to the bearings 140, each having an axially extended inner race 225 slidably fitted to the shaft 180 below the upper end 181 thereof and a seal 226. Each bearing 224 of the second assembly has a setscrew 227 extending radially through the inner race and screw-threadably engaged with it. The second bearing assembly is positioned axially on the shaft so that the upper end of the upper inner race engages the lower side of the disk 201 of the fan 200. The setscrew of the upper of the bearings 224 is provided with a head 228 extending radially from the inner race thereof. This setscrew engages in positive rotational driving relation the driving tab 207 of the fan 200. The second bearing assembly has a circular flange 235 circumscribing the tube 221 at the upper end thereof and coaxially related to the shaft 180. The flange is substantially planar and normal to the axis 142. The flange is provided with a plurality of bores 236 extending therethrough parallel to the shaft and circumferentially equally spaced about the periphery thereof. The flange and the tube are mounted on the shaft, but can rotate independently thereof due to the interposed ball bearings 224.

The flail shredder includes a circular guide wheel indicated generally by the numeral 240 and best shown in FIGS. 1, 2, and 7, concentrically mounted on the flange 235, of the second bearing assembly 220. The wheel is coaxially related to the drive shaft 180 and, being mounted on the flange 235, can rotate independently thereof. The wheel includes an imperforate circular shield 241 having a circular, planar disk 242 downwardly engaged in parallel relation with the flange 235. The shield includes a resilient tubular rim 243 circumscribing the disk and providing a cushioned periphery for the shield. The rim is shown in FIG. 2 engaging a trunk 18 of the row crop. The disk has an upper planar surface 244 which is concentric with the shaft 180. The disk has a central coaxial bore 245 fitted to the exterior of the tube 221 of the second bearing assembly and has a plurality of bores 246 radially spaced about the central bore and individually aligned with the bores 236 in the flange. A plurality of bolt assemblies 247 correspond individually to each aligned pair of bores 236 and 246 and extend through said bores to secure the guide wheel to the second bearing assembly.

The circular shield 241 has an annular channel member 250, best seen in FIG. 7, which is wrapped peripherally about the circular disk 242. The channel member has a back portion 251 and a pair of axially spaced, circumferential flanges 252 which define an outwardly facing depression 253 circumscribing the disk. The channel member is disposed so that the disk engages the back portion, and is fixed thereto, as by welding, oppositely of the upper flange 252. The tubular rim 243 is fitted into the depression 253 and is held in engagement with the back and the flanges by a cable 255 extending through the tubular rim and circumscribing the channel member. The cable is tensioned in a manner subsequently to be described so as firmly to engage the interior of the rim adjacent to the channel member. The cable, preferably, is formed by a length of wire rope. The tubular rim is constructed of a length of tubing 257 formed of a resilient material such as rubber hose. The length of tubing has opposite ends 258 which are disposed, as shown in FIGS. 2 and 10, in abutting relation when the length is wrapped circumferentially about the channel member.

Figure 10:
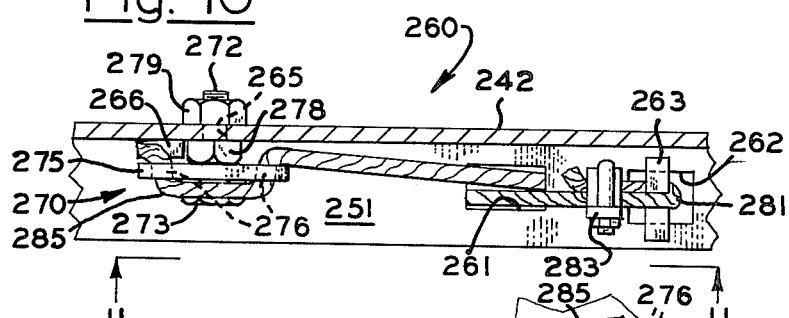
FIG. 10 is a fragmentary vertical section at an enlarged scale taken on line 10—10 of FIG. 2 showing a cable tensioning apparatus.
Figure 11:
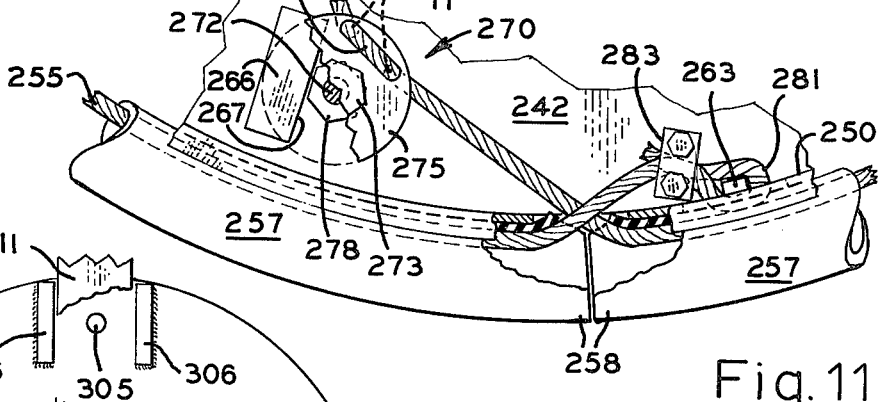
FIG. 11 is a fragmentary view taken from the position of line 11—11 of FIG. 10.

The cable 255 is secured about the periphery of the guide wheel 240 by cable tensioning apparatus 260 best shown in FIGS. 10 and 11. The apparatus provides a first slot 261 extending through the back 251 of the channel member 250. The opposite ends 258 of the tubing forming the resilient rim of the guide wheel 240 abut centrally of the first slot. A second slot 262 extends through the back of the channel member and is spaced circumferentially of the wheel from the first slot. The second slot is elongated circumferentially of the rim. An anchor bar 263 extends transversely across the slot longitudinally centrally thereof. The bar is fixed, as by welding, to the back of the channel member oppositely to the resilient rim. The cable tensioning apparatus includes a bore 265 extending through the circular disk 242 adjacent to the channel member. The bore is spaced circumferentially of the wheel from the first slot oppositely of the second slot. A locking bar 266 is fixed, as by welding, to the disk adjacent to the bore. The bar is in parallel engaging relation with the disk and is fixed on the side thereof adjacent to the slots 261 and 262. The bar has a planar side 267 disposed toward the bore 265 and extending substantially tangentially to a circle concentrically related to the bore. The planar side of the bar is spaced from the bore for a purpose subsequently to be described.

The cable tensioning apparatus 260 includes a winch 270 mounted on the circular disk 242 for rotational movement in the bore 265. The winch includes a conventional bolt 271 having a screw-threaded shank 272 and a hexagonal head 273. A washer 275 is fitted over the shank in engagement with the head and is fixed thereto as by welding. The washer has a pair of bores 276 extending through the washer parallel to the shank and radially spaced therefrom. The bores are adjacent and disposed at one side of the shank. A fixed nut 278 is secured onto the shank against the washer and secured thereto as by welding. This nut is of conventional hexagonal form. The planar side 267 of the locking bar 266 adjacent to the bore 265 is spaced radially from the center of the bore a slightly greater distance than a side of the nut is spaced radially from the center of the bolt. The shank of the bolt 271 extends from the fixed nut oppositely of the washer and is extended through the bore 265. A jamb nut 279 is screw-threadably engaged with the shank oppositely of the disk 242 from the fixed nut.

Each of the opposite end portions of the length of wire rope forming the cable 255 extends from within the tubular rim 243 at the abutting ends 258 through the first slot 261. The opposite ends extend through the slot in opposite directions circumferentially of the circular disk 242. One of the portions extends in a path toward the anchor bar 263 to a return bend 281 thereabout. This end portion returns from the bend in a path which extends toward the slot substantially parallel to the path of this end portion from the slot. A cable clamp 283 of a well-known type engages the end portion along both of said paths oppositely of the bend from the anchor bar. The clamp compresses the end portions together along said paths to anchor said end portions to the guide wheel 240 about said bar. The other end portion of the cable extends from the first slot 261 toward the winch 270 and through one of the bores 276 in the washer 275. The end portion then passes through the other bore in the washer to the side of the washer to which the end portion extends from the slot. The end portion of the cable thus forms a bight 285 which is frictionally engaged by the bores 276 so that the end portion of the cable does not slip through the bores when the cable is tensioned. The bolt 271 can be rotated by any suitable wrench engaging the head 273 when the fixed nut 278 is not engaged with the locking bar 266. Such rotation of the bolt winds the cable thereabout so as to tension the cable about the periphery of the guide wheel 240 and secure about the tubular rim. When the cable is suitably tensioned, the bolt is slid through the bore 265 so that one of the sides of the hexagonal fixed nut 278 engages the planar side 267 of the locking bar. When said nut and bar are so engaged the bolt cannot rotate and the cable is clamped in its tensioned state. The bolt is prevented from moving axially so as to disengage the fixed nut and locking bar by tightening the jamb nut 279 which draws the fixed nut securely against the circular disk 242.

Figure 12:
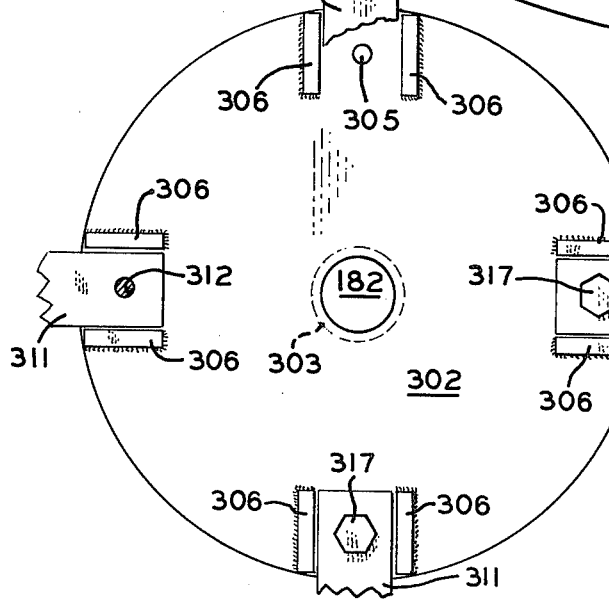
FIG. 12 is a fragmentary bottom plan view taken from the position of line 12—12 of FIG. 7.

The flail shredder is provided with a flail assembly, best shown in FIGS. 2, 7 and 12 and indicated generally by the numeral 300, mounted on the lower end 182 of the drive shaft 180. The flail assembly is thus disposed between the earth surface 17 and the guide wheel 240 for orbital movement about the drive shaft in upwardly spaced adjacent relation to the earth surface and downwardly spaced adjacent relation to the guide wheel. This assembly includes a planar circular rotor 302 coaxially related to the drive shaft and fixed, as by welding, to the lower end thereof. The upper surface of the rotor is provided with an annular seat 303, best shown in FIG. 12, which engages in supporting relation the lower axial end of the lower inner race 225 of the second bearing assembly 220. As best shown in FIG. 2, the diameter of the rotor is approximately one-half of the diameter of the guide wheel 240. The rotor is provided with a plurality of bores 305 extending therethrough parallel to the shaft. The bores are disposed adjacent to the periphery of the rotor in substantially equal angularly spaced relation thereabout. A pair of elongated rectangular lugs 306, best shown in FIG. 12, are fixed, as by welding, to the rotor adjacent to each bore. As best shown in FIG. 12, the lugs of each pair are spaced equally oppositely of the bore circumferentially of the rotor. Longitudinally, the lugs of each pair extend substantially parallel to a diameter of the rotor extending through the center of their respective bore. The lugs extend from a point adjacent to the bore to the periphery of the rotor and extend an approximately equal distance oppositely of the periphery from said point.

The flail assembly 300 includes a plurality of generally rectangular elongated plates 310 individually related to the bores 305 in the rotor 302. Each plate extends transversely between the lugs 306 adjacent to its respective bore. Each plate extends longitudinally from the inner ends of the lugs to an outer end portion 311 outwardly extended from the rotor. Each plate has an inner bore 312 extending therethrough and aligned with its respective bore 305 in the rotor. Each plate has an outer bore 313 in the outer end portion thereof extending therethrough parallel to the drive shaft 180. The corners 314 of the outer end portion are beveled. A chain link 315 is linked through the outer bore 313 of each plate. The beveled corners permit the link to swivel freely in a plane parallel to the rotor. A bolt assembly 317 extends through each aligned pair of these bores to secure the plate to the rotor.

The flail assembly 300 includes a plurality of flails 320 individually related to the bores 305 in the rotor 302. Each of the flails has an inner, link portion 321 and an outer, elongated, planar flail bar portion 322. The link portion is formed from a conventional, elongated chain link and is linked with its respective chain link 315 which, in turn, links the outer bore 313 of the related plate 310. The flail bar portion is fixed, as by welding, to a longitudinal end of the link portion with the longitudinal axes of said portions substantially aligned. The upper longitudinal edges of the bar portion are beveled adjacent to the outer end thereof as shown in FIGS. 7 and 12. This beveling forms a pair of opposite cutting edges 325 at the lower side of said bar portion. The lower side is hard surfaced between the cutting edges.

When the rotor 302 is rotationally driven by the hydraulic motor 160 the links 315 and flails 320 move in orbits concentric to the shaft 180. When so driven the links and flails are extended by centrifugal force as indicated by the arrow 327 in FIG. 1, so as to be substantially in the plane of the plates 310 as shown in FIG. 1. When the rotor is turning very slowly or is stationary, the links permit the flails to swivel downwardly from the rotor under the urging of gravity to the position shown by the dashed lines in FIG. 1. The rotor, plates, links, and flails are dimensioned and proportioned such that the overall diameter of the flail assembly, which is equal to the diameter of the orbit described by the outer ends of the flail bars, is less than the diameter of the guide wheel 240 as best shown in FIG. 2.

The flail shredder includes a brake assembly, indicated generally by the numeral 330 and best shown in FIG. 7. The brake assembly is mounted on the distal end 72 of the arm 70 for frictional engagement of the guide wheel 240. The brake assembly includes an upper, elongated arm 331 fixed, as by welding, at one end to the upper of the mounting plates 125 of the first bearing assembly 120. The upper arm extends radially from the bearing assembly in parallel relation to the upper surface 244 of the disk 242 and to the arm 70. The upper arm extends oppositely of the forward end 71 of the arm 70 to a distal end spaced from the bearing assembly approximately one-third of the radius of the disk. A screw-threaded bore 332 extends through the fixed arm adjacent to the distal end thereof in substantially parallel relation to the shaft 180. The brake assembly includes a lower, elongated, movable arm 335 pivotally mounted on the lower of the mounting plates 125 for movement about an axis extending substantially parallel to the disk 242 and substantially tangential to a circle concentric with the shaft 180. The lower arm, preferably, is mounted by a hinge 336 disposed adjacent to the said lower mounting plate and downwardly from the fixed arm 331. The lower arm extends from the hinge radially of the bearing assembly in downwardly disposed, parallel relation to the upper arm to a distal end 337. The distal end is spaced from the bearing assembly a distance equal to approximately two-thirds of the radius of the disk 242. The movable arm extends radially of the disk and downwardly from the hinge to a bend 338 spaced toward the center of the wheel from the bore 332 in the upper arm. From the bend, the lower arm extends in parallel spaced adjacent relation to the upper surface 244 of the disk to a distal end 337. A bore 339 extends through the lower arm in substantial alignment with the screw-threaded bore 332 in the upper arm. The bore 339 is somewhat larger in diameter than the bore 332 and is not provided with screw threads.

The brake assembly includes a friction pad 345 mounted on the distal end 337 of the movable lower arm 335 for pivotal movement about the hinge 336. The pad is mounted downwardly of the distal end for movement therewith toward and from the circular planar upper surface 244 of the disk 242 of the guide wheel 240. The friction pad, preferably, is of a type used for automotive disk brakes having a layer of friction material 346 mounted on a backing plate 347. The friction material is disposed toward the surface 244 and the backing plate is releasably secured to the distal end of the lower arm by a plurality of bolt assemblies 348. Each bolt assembly extends through a pair of aligned bores, not shown, which extend, respectively, through the distal end and through the backing plate.

The brake assembly includes a guide rod 350 extending through the bores 332 and 339, respectively, in the upper, fixed arm 331 and the lower, movable arm 335. The guide rod is externally screw-threaded throughout its length and screw-threadably engages the upper bore 332. The guide rod can slide axially in the larger diameter lower bore 339. The rod extends through and a short distance beyond the upper bore. The rod is screw-threadably engaged oppositely of the upper arm by a pair of clamp nuts 352. The nuts are tightened against the arm on the opposite sides thereof to secure the rod thereto. The guide rod extends through the lower bore and is screw-threadably engaged upwardly thereof and centrally of the rod by an adjusting nut 353. A compression spring 355 is coaxially mounted about the guide rod. The axially opposite ends of the spring bear, respectively, on the adjusting nut and the upper surface of the lower arm 335. The spring resistently urges the lower arm away from the adjusting nut so that the friction material 346 is, in turn, urged into frictional, braking engagement with the upper surface 244 of the disk 242 of the guide wheel 240. The force exerted by the spring can be selectively increased or decreased by screwing the adjusting nut downwardly or upwardly along the guide rod.

OPERATION

The operation of the described embodiment of the present invention is believed to be clearly apparent, and is briefly summarized at this point. The flail shredder is mounted, as previously described, on a tool bar 15 of a carrying device by the tool clamp 25 of the mounting assembly 20 of the shredder.

Initially, the shredder is adjusted, as best visualized from FIGS. 1 and 2, to align the flail assembly 300 with the earth surface 17 for a particular combination of carrying device, conformation of the earth surface, and row crop with which the shredder is to be utilized. This adjustment can be made in any order, but the following sequence is convenient. First, the mounting assembly 20 is positioned transversely in relation to the row crop by positioning the tool clamp 25 at a selected location along the tool bar. Second, a bolt assembly 158 is inserted through the plate 156 and selected bore 130 to position the first bearing assembly and elements mounted thereon elevationally in relation to the arm 70. Such insertion of the bolt assembly also determines the axis 159 about which the bearing assembly can be pivoted to vary the angular relation between the arm and the axis 142 in a plane which includes the axis 73 of the arm. Third, such a desired angular relation is selected and the bolt assemblies 158 are tightened. This tightening maintains the selected angular relation by clamping the plate 156 of the clamp 150 to the vertical plate 122 of the first bearing assembly. Next, the desired angular position of the axis 142 in a plane normal to the arm is obtained by rotating the clamp 150 about the arm. The desired position of the flail assembly axially of the arm is obtained by sliding this clamp along the arm. The bolt assemblies 154 are then tightened to maintain these angular and translational positions.

The position assumed by the distal end 72 of the arm 70 transversely of the line of travel, in the absence of obstructions such as the trunks 18, is adjusted by the stop 90. The corresponding position of the flail assembly 300 and other elements mounted on the arm adjacent to the distal end thereof is, of course, also determined by the adjustment of the stop. The distal end of the arm resiliently is urged by the spring 65 to pivot about the first pivotal axis 32 toward the row planted with the trunks 18. Such pivotal movement extends the chain 108 and is, therefore, adjusted by varying the effective length of the chain. This effective length is determined by selecting a particular link 109 of the chain for engagement by the ear 102 of the swivel 99 connected to the distal end of the arm. As shown in FIG. 2, the stop is adjusted to position the arm so that the orbit described by the flails 320 extends between the trunks so that weeds between the trunks are shredded by the flails. In this position of the arm, the guide wheel 240, which is larger in diameter than said orbit, successively engages each trunk in the row as the shredder moves therealong.

The arm 70 can be pivoted about the second pivotal axis 41, as previously described, by extending or contracting the hydraulic ram 82. This pivotal movement can be utilized in adjusting the flail shredder to a particular configuration of earth surface 17. However, this movement is primarily useful in raising the flail assembly 300 and guide wheel 240 substantially away from the earth surface for convenience in transporting the flail shredder to and from the field and when moving from row to row therein. When transporting the shredder to and from the field, rotation of the hydraulic motor 160, drive shaft 180, and flail assembly 300 can be stopped by shutting off the supply of hydraulic fluid thereto. When the flail assembly stops, the flails 320 swivel downwardly to the position indicated in dash lines in FIG. 1. When the flails are so disposed it is desirable to elevate the distal end of the arm with the hydraulic ram to avoid engagement of the flails with the earth surface.

When the flail shredder is properly adjusted in the manner described, it is transported by the carrying device along the line of travel indicated by the arrow 16 parallel to the row having the trunks 18 with the hydraulic motor 160 energized. Such energization results, as previously described, in the drive shaft 180 being rotationally driven in the direction of the arrow 170 at approximately 2000 revolutions per minute. The flail assembly 300 rotates with the shaft so that the flails 320 orbit thereabout and centrifugally are urged to swivel upwardly as indicated by the arrow 327.

The guide wheel 240 is urged to rotate by engagement with the trunks 18 and with weeds as the shredder is transported along the row. However, the primary force urging the guide wheel to rotate is provided from the drive shaft 180. Although the guide wheel is mounted on the drive shaft for rotation independently thereof by the ball bearings 224, friction within the bearings, although slight, is sufficient to urge the guide wheel to rotate. The guide wheel frictionally is urged to rotate at a speed substantially greater than the rotational speed equivalent to that at which the wheel would revolve if driven from the ground surface when the shredder is being transported by the carrying device. When the rim contacts the trunks as the shredder moves along the row, excess rotational speed may damage the trunks 18 of the crop and cause unnecessary wear to the resilient tubular rim 243. The brake assembly 300 prevents such excess speed by engagement of the friction pad 345 thereof with the guide wheel. As previously described, the spring 355 urges the distal end of the movable arm 335 toward the circular upper surface 244 of the disk 242 so that the friction material 346 is pressed against the disk to limit the rotational speed thereof. The frictional resistance to rotation of the guide wheel imposed by the brake assembly can be varied by the adjusting nut 353. As a result, the rotational speed of the guide wheel is maintained approximately equal to a rotational speed equivalent to that which would be derived from the earth traversing velocity of the shredder. This rotational speed can be obtained despite variations in such velocity, contact with the wheel by the trunks and weeds along the row, the condition of said ball bearings and the brake pad, and the state of cleanliness of the upper surface of the guide wheel.

As the flail shredder moves along the line of travel in the direction indicated by the arrow 16 with the hydraulic motor 160 rotationally driving the flail assembly 300 adjacent to the earth surface 17, standing weeds are struck by the outwardly extended flails 320. The flails cut down the weeds adjacent to the earth surface and comminute the resultant debris. Since the flails are swivelly mounted on the rotor 302 by the links 315, engagement of a flail with a substantial obstruction, such as a stone, swivels the flail rotationally rearwardly of its respective plate 310 to prevent a violent shock to other elements of the shredder. When the obstruction is passed by or dislodged, the flail is returned to its extended position by centrifugal force. The comminuting action of the flail assembly is even more effective when the shredder is employed on weeds which previously have been killed chemically and are still standing because of their brittle condition.

As the flail shredder moves in the direction indicated by the arrow 16 parallel to the row, the shredder, of course, encounters, as shown in FIG. 2, obstructions such as the trunks 18. Upon such encounter the shredder engages the trunk with the resilient rim 243 of the guide wheel 240. Since the wheel is cushioned peripherally by the rim, the impact of the shredder against the trunk is absorbed by the resilient action of the rim without mechanical injury to the trunk or other portions of the plant. Injury to the plant by heat or chemical action is, of course completely avoided by the mechanical nature of the basic weed destroying action of the flail shredder. When a trunk is encountered, as best visualized from FIG. 2, the trunk presses against the wheel with a force which urges the wheel away from the row and away from the position determined by the stop 90. This force is transmitted by the wheel to the shaft and from the shaft to the flail assembly 300 and other elements of the shredder mounted for pivotal movement about the axis 32. Since the guide wheel is rotating in the direction indicated by the arrow 170, the guide wheel engages each trunk in a rolling relation so that the wheel is deflected by the obstruction. As a result, the distal end 72 of the arm is retracted away from the trunk or other obstruction together with the drive shaft and the flail assembly. The orbiting flails are thus deflected so they do not engage the row crop as the shredder moves along the row. The flail assembly does not engage the crop as the guide wheel passes around each trunk because the guide wheel is larger in diameter than the orbit described by the flail assembly about the shaft. The crop is, therefore, not injured by the flails 320 while the flails shred and comminute weeds adjacent to the trunk. As the guide wheel passes by each trunk, the wheel is resiliently urged to return to the adjustably limited position determined by the stop 90. Continued movement of the shredder along the row permits the flail assembly to continue to comminute weeds between the trunk just passed and the next trunk in succession. During such movement the shredder repeats the operation previously described as it passes around each trunk with the flail assembly being deflected as urged by the guide wheel and then returning to the position determined by the stop as the spring 50 resiliently urges the arm 70 to pivot about the axis 32.

As the flail shredder moves along the row crop along the line of travel in the direction indicated by the arrow 16, the distal end 72 of the arm 70, as previously described, continues to be urged transversely by each trunk 18 and then to return against the stop 90 under the urging of the spring 50. During such movements along and transversely of the row, the imperforate shield 241 forming the guide wheel 240 prevents portions of the plants forming the row crop and extending toward the earth surface from being engaged by the flail assembly and damaged thereby. Such engagement is prevented in part by the shield, which does not allow such portions to extend downwardly into the flail assembly. Such engagement is also prevented because the resilient rim 243 urges such portions upwardly away from the flail assembly as the portions are contacted by the rim during movement of the distal end relative to the earth surface.

As the hydraulic motor 160 rotationally drives the drive shaft 180 and flail assembly 300, the fan 200, as previously described, is driven so as to rotate therewith by the setscrew head 228. As the fan rotates, air is expelled radially therefrom between the bearing assemblies 120 and 220. The air flow induced by the fan, as indicated by the arrows 209 in FIG. 7, prevents the accumulation of debris about the shaft between the bearing assemblies. Injury by such debris to the ball bearings 140 and 224, respectively, in the bearing assemblies is thus avoided.

The resilient tubular rim 243 circumscribing the disk 242 conveniently can be replaced in the following manner. Referring to FIGS. 10 and 11, the jamb nut 279 is first unscrewed sufficiently on the bolt 271 so that the bolt can be slid axially to a position where the head 273 thereof does not engage the locking bar 266. The bolt is then slid to such a disengaged position, and permitting the bolt to rotate and relieve tension on the cable 255 within the rim. The cable is then pulled from the bores 276 in the washer 275 and through the slot 261. The rim is then pulled from the cable beginning at the end portion thereof which engaged the washer. The opposite end portion of the cable remains anchored about the bar 263 while replacing the tubular rim. A new length 257 of tubing is inserted over the cable, the cable is inserted through the first slot 261, and the opposite ends 258 of the length of tubing abutted centrally of the slot. The cable is then tensioned about the periphery of the guide wheel 240 and releasably clamped thereto with the winch 270 as previously described.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A flail shredder comprising:
   A. a drive shaft;
   B. means mounting the drive shaft for rotation about an upwardly extended longitudinal axis;
   C. means mounting the drive shaft for earth traversing movement along a line of travel transversely of the axis;
   D. means mounting the drive shaft for adjustable movement transversely of the line of travel;
   E. a flail assembly mounted on the lower end of the shaft;
   F. drive means connected to the shaft;
   G. a stop limiting adjustable movement of the shaft transversely of the line of travel in one direction;
   H. means resiliently urging the shaft toward the stop;
   I. a bearing mounted on the shaft above the flail assembly;
   J. a circular guide wheel mounted concentrically on the bearing for rotation independently of the shaft and the flail assembly disposed for rolling engagement with obstructions to urge the shaft and the flail assembly away from the stop to pass about such obstructions; and
   K. adjustable brake means for frictionally engaging the guide wheel and limiting the rotational speed thereof relative to the shaft.

2. For use with an implement carrying device adapted to move along a row of a row crop, a flail shredder comprising:
   A. an arm rearwardly extended from the device to a distal end, the arm having a forward end pivotally mounted on the device for movement of the distal end about an erect first axis toward and from the row in upwardly spaced relation to the earth surface;
   B. a shaft mounted on the arm adjacent to the distal end thereof for rotational movement about an upwardly extended axis;
   C. means for resiliently urging the distal end of the arm toward the row;
   D. a stop mounted on the device for limiting said movement of the arm toward the row;
   E. powered means connected to the shaft for rotating the same;
   F. a flail assembly mounted on the shaft for orbital movement thereabout adjacent to the earth surface;
   G. a circular guide wheel mounted on the distal end of the arm for rotational movement concentrically and independently of the shaft upwardly adjacent to the flail assembly, the guide wheel having a diameter greater than the orbit described by the flail assembly and being disposed for rolling engagement of the periphery of the wheel with obstructions along the row to retract the distal end of the arm for passage of the flail assembly about the obstructions;
   H. a resilient tubular rim circumscribing the guide wheel;
   I. a cable extending through the rim;
   J. means mounted on the wheel for tensioning the cable about the periphery of the wheel; and
   K. means for releasably clamping the cable when so tensioned.

3. For use with an implement carrying device adapted to move along a row of a row crop, a flail shredder comprising:
- A. an arm rearwardly extended from the device to a distal end, the arm having a forward end pivotally mounted on the device for movement of the distal end about an erect first axis toward and from the row in upwardly spaced relation to the earth surface;
- B. a shaft mounted on the arm adjacent to the distal end thereof for rotational movement about an upwardly extended axis;
- C. means for resiliently urging the distal end of the arm toward the row;
- D. a stop mounted on the device for limiting said movement of the arm toward the row;
- E. powered means connected to the shaft for rotating the same;
- F. a flail assembly mounted on the shaft for orbital movement thereabout adjacent to the earth surface;
- G. a circular guide wheel mounted on the distal end of the arm for rotational movement concentrically and independently of the shaft upwardly adjacent to the flail assembly, the guide wheel having a diameter greater than the orbit described by the flail assembly and being disposed for rolling engagement of the periphery of the wheel with obstructions along the row to retract the distal end of the arm for passage of the flail assembly about the obstructions, and said guide wheel having a circular planar surface concentric with the shaft;
- H. a friction pad mounted on the distal end of the arm for movement toward and from the planar surface; and
- I. means for urging the pad toward the surface into frictional engagement therewith so as to brake the rotation of the wheel relative to the arm.

4. For use with an implement carrying device adapted to move along a row of a row crop, a flail shredder comprising:
- A. an arm rearwardly extended from the device to a distal end, the arm having a forward end pivotally mounted on the device for movement of the distal end about an erect first axis toward and from the row in upwardly spaced relation to the earth surface;
- B. a shaft mounted on the arm adjacent to the distal end thereof for rotational movement about an upwardly extended second axis;
- C. means for resiliently urging the distal end of the arm toward the row;
- D. a stop mounted on the device for limiting said movement of the arm toward the row;
- E. powered means connected to the shaft for rotating the same;
- F. a flail assembly mounted on the shaft for orbital movement thereabout adjacent to the earth surface;
- G. a circular guide wheel mounted on the distal end of the arm for rotational movement concentrically and independently of the shaft upwardly adjacent to the flail assembly, the guide wheel having a diameter greater than the orbit described by the flail assembly and being disposed for rolling engagement of the periphery of the wheel with obstructions along the row to retract the distal end of the arm for passage of the flail assembly about the obstructions, said arm being extended along a third axis and the shaft being mounted on the arm for pivotal movement about said third axis, for translational movement along the upwardly extended first axis, and for pivotal movement about a fourth axis extending at right angles to both of said first and third axes; and
- H. means releasably clamping the shaft to the arm for selective positioning along each of said movements to align the flail assembly with the earth surface.

5. In a flail shredder:
- A. an arm having predetermined forward and rearward ends;
- B. means mounting the forward end of the arm for earth traversing movement and for pivotal movement about a substantially erect first axis;
- C. a shaft mounted on the rearward end of the arm for rotational movement about a substantially erect axis;
- D. means resiliently urging the rearward end of the arm in a predetermined pivotal direction about the first axis;
- E. a stop engageable by the arm to limit pivotal movement thereof in said predetermined direction;
- F. powered means connected to the shaft to rotate the same;
- G. a flail assembly mounted on the shaft, the arm being extended along an axis longitudinally thereof and the shaft being mounted on the arm for pivotal movement about the longitudinal axis and for pivotal movement about an axis extending at right angles to both the first axis and the axis longitudinally of the arm; and
- H. means releasably clamping the shaft to the arm in adjusted positions about said first axis, said longitudinal axis, and said right angularly extended axis.

* * * * *